(No Model.)
G. G. SOWDER.
TWO WHEELED VEHICLE.
No. 327,733. Patented Oct. 6, 1885.
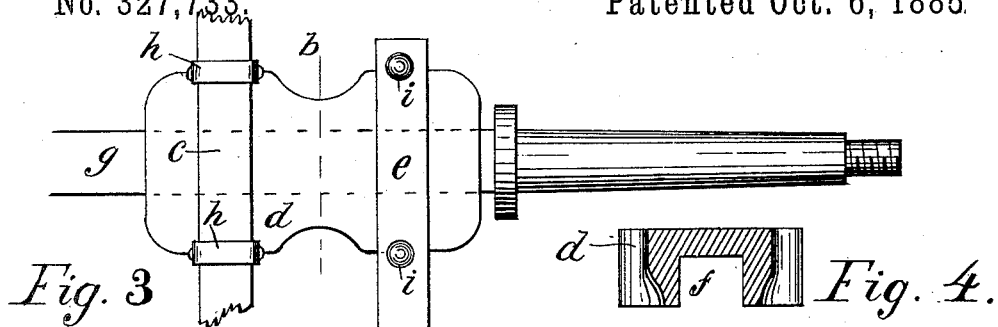
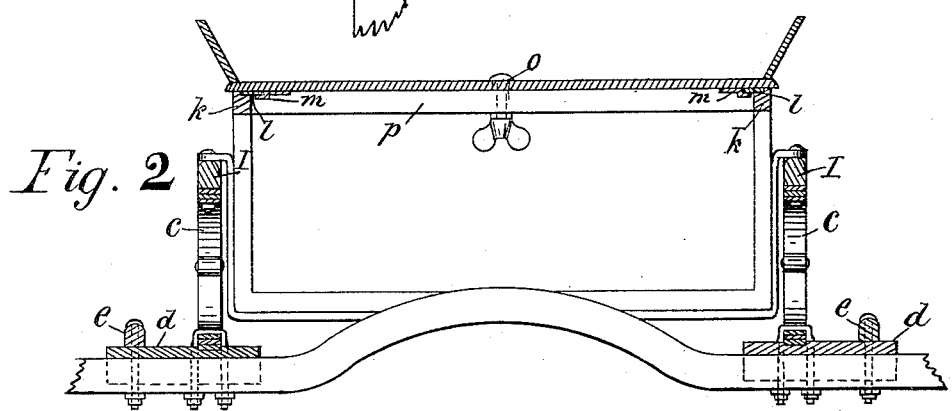
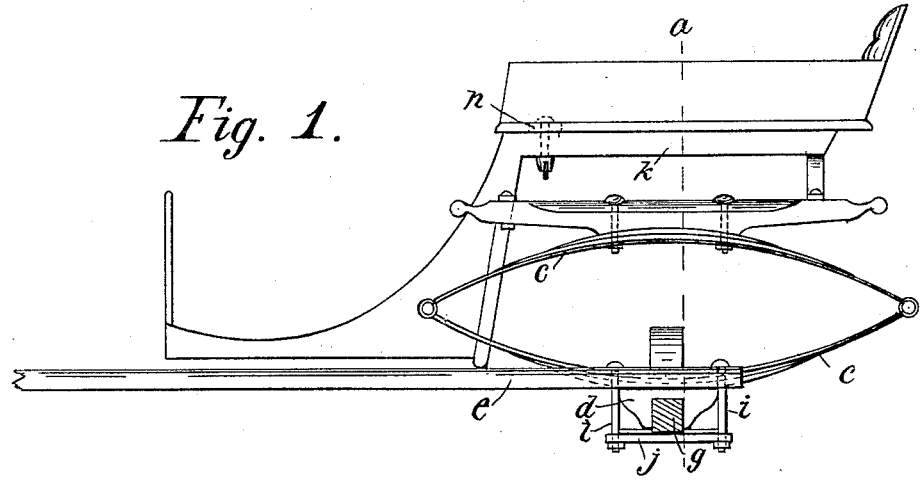
WITNESSES:
V. M. Hood.
M. Carsten
INVENTOR:
Granville G. Sowder
By H. P. Hood
Att'y.

UNITED STATES PATENT OFFICE.

GRANVILLE G. SOWDER, OF NORTH SALEM, INDIANA.

TWO-WHEELED VEHICLE.

SPECIFICATION forming part of Letters Patent No. 327,733, dated October 6, 1885.

Application filed May 23, 1885. Serial No. 166,430. (No model.)

*To all whom it may concern:*

Be it known that I, GRANVILLE G. SOWDER, a citizen of the United States, residing at North Salem, in the county of Hendricks and State of Indiana, have invented a new and useful Improvement in Two-Wheeled Vehicles, of which the following is a specification.

My invention relates to an improved means for connecting the body and seat with the axle in a two-wheeled vehicle.

The objects of my improvement are to prevent the movements of the horse, when attached to the vehicle, from oscillating the body of the vehicle, to so secure the spring on which the body is mounted and the shafts to the axle that all shall securely maintain their relative positions, and means for adjusting the position of the seat to the load carried, all as hereinafter described.

The accompanying drawings illustrate my invention. Figure 1 is a side elevation. Fig. 2 is a section through $a$, Fig. 1, the view being from the rear. Fig. 3 is an enlarged plan view showing one end of the axle and the coupling-iron to which the axle, spring, and shafts are secured. Fig. 4 is a cross-section of the same at $b$.

In this class of vehicles, as heretofore constructed, the shafts have usually been attached to the body of the vehicle at some point forward of the axle, thus communicating the vertical movement of the shafts to the front end of the body of the vehicle.

In my improved vehicle the body is mounted upon a pair of ordinary elliptic springs, $c\ c$, which rest, respectively, upon the coupling-irons $d\ d$. Said coupling-irons each consist of a casting having a broad upper surface of sufficient length to furnish a firm support and point of attachment for both the spring $c$ and the rear end of the shaft $e$, and having an under surface which is provided with a longitudinal groove, $f$, into which the axle $g$ fits closely.

A pair of clip-irons, $h\ h$, embrace the spring, the coupling-iron, and the axle, and are connected by suitable bars underneath the axle, so as to clamp the spring, coupling-iron, and the axle together by means of nuts screwed on the ends of the clips.

The rear end of the shaft $e$ is secured also to the coupling-iron, and the said iron is further clamped to the axle by means of bolts $i\ i$, which pass through or otherwise engage the shaft and a connecting-bar, $j$, beneath the axle. The body-frame I is mounted upon and secured to the springs in any well-known and suitable manner.

It will thus be seen that the body has no connection with the shafts, except through the coupling-irons $d$, which are bolted securely to the axle. The springs and the shafts being respectively secured on each side to one piece, which has a long and close bearing on the axle, to which it is secured by the fastenings of both the springs and shafts, all shifting sidewise of the springs or shafts is avoided.

It is desirable in this class of vehicles to provide means for adjusting the position of the seat forward or backward for loads of different weight. For this purpose the seat is arranged to slide backward or forward on the frame-work of the body, and is secured in the following manner: To the upper surface of each of the side bars, $k$, is secured a flat strip of iron, $l$. Said strips $l$ are arranged to project inward, and are engaged by corresponding strips, $m$, secured to the under side of the seat. Near the front edge of the seat a slot, $n$, is made, and a bolt, $o$, passes through the front bar, $p$, of the body-frame and through said slot. The head of the bolt engages the seat, and the seat sliding on the ways $l$ is fastened in position by the bolt and thumb-nut.

I claim as my invention—

In a two-wheeled vehicle, the combination of the coupling-iron $d$, having a groove adapted to receive and fit the axle, a spring adapted to support the body, and a shaft, both secured to said coupling-iron and to the axle by clips or bolts, substantially as specified.

GRANVILLE G. SOWDER.

Witnesses:
H. P. HOOD,
V. M. HOOD.